(12) United States Patent
Cheng et al.

(10) Patent No.: US 12,734,500 B2
(45) Date of Patent: Sep. 15, 2026

(54) DEVICE FOR CONTINUOUSLY PRODUCING HYDROGEN FROM POLYESTER PLASTICS BY PHOTOCATALYTIC DEGRADATION

(71) Applicant: TIANJIN UNIVERSITY, Tianjin (CN)

(72) Inventors: Zhanjun Cheng, Tianjin (CN); Hui Zhou, Tianjin (CN); Pengpeng Luan, Tianjin (CN); Beibei Yan, Tianjin (CN); Guanyi Chen, Tianjin (CN)

(73) Assignee: Tianjin University, Tianjin (CN)

( * ) Notice: Subject to any disclaimer, the term of this patent is extended or adjusted under 35 U.S.C. 154(b) by 745 days.

(21) Appl. No.: 18/207,825

(22) Filed: Jun. 9, 2023

(65) Prior Publication Data

US 2023/0398512 A1 Dec. 14, 2023

(30) Foreign Application Priority Data

Jun. 10, 2022 (CN) ........................ 202210656490.5

(51) Int. Cl.
*B01J 19/18* (2006.01)
*B01J 4/00* (2006.01)
(Continued)

(52) U.S. Cl.
CPC ........... *B01J 19/1862* (2013.01); *B01J 4/001* (2013.01); *B01J 19/0066* (2013.01);
(Continued)

(58) Field of Classification Search
CPC .... B01J 19/1862; B01J 4/001; B01J 19/0066; B01J 19/127; B01J 2204/002; B01J 2204/005; B01J 2219/00182; B01J 2219/0869; B01J 2219/0877; B01J 2219/1203; B01J 19/20; C01B 3/22; C01B 2203/0277; C01B 2203/1211;
(Continued)

(56) References Cited

U.S. PATENT DOCUMENTS

2023/0294984 A1* 9/2023 Khatiwada ............ B01J 19/087 423/373

OTHER PUBLICATIONS

CN 113636716 translation (Year: 2021).*

* cited by examiner

*Primary Examiner* — Randy Boyer
*Assistant Examiner* — Juan C Valencia
(74) *Attorney, Agent, or Firm* — Bay State IP, LLC

(57) ABSTRACT

A device for continuously producing hydrogen from polyester plastics by photocatalytic degradation is provided, including: a machine housing; a feeding mechanism provided at one side of the machine housing, a bottom of the feeding mechanism is in communication with a dissolving mechanism for transporting waste plastics to the dissolving mechanism; a dissolving mechanism provided inside the machine housing and configured for hydrolyzing the waste plastics into a solution containing small molecule monomers by means of a dissolving solution, the dissolving mechanism transports the solution to a photocatalytic reactor through a solution circulation pipeline; the solution circulation pipeline provided at the other side of the machine housing, two ends of the solution circulation pipeline are respectively connected to the dissolving mechanism and the photocatalytic reactor; the photocatalytic reactor provided above the dissolving mechanism and configured for degrading plastics in the solution to collect a reaction solution and hydrogen.

10 Claims, 5 Drawing Sheets

(51) Int. Cl.
*B01J 19/00* (2006.01)
*B01J 19/12* (2006.01)
*C01B 3/22* (2006.01)

(52) U.S. Cl.
CPC ............... *B01J 19/127* (2013.01); *C01B 3/22* (2013.01); *B01J 2204/002* (2013.01); *B01J 2204/005* (2013.01); *B01J 2219/00182* (2013.01); *B01J 2219/0869* (2013.01); *B01J 2219/0877* (2013.01); *B01J 2219/1203* (2013.01); *C01B 2203/0277* (2013.01); *C01B 2203/1211* (2013.01); *C01B 2203/1258* (2013.01)

(58) Field of Classification Search
CPC ............... C01B 2203/1258; C08J 11/10; C08J 2367/00; C10G 1/10; Y02W 30/62
See application file for complete search history.

DEVICE FOR CONTINUOUSLY PRODUCING HYDROGEN FROM POLYESTER PLASTICS BY PHOTOCATALYTIC DEGRADATION

CROSS REFERENCE TO RELATED APPLICATION

This patent disclosure claims the benefit and priority of Chinese Patent Application No. 202210656490.5, entitled "Device for Continuously Producing Hydrogen from Polyester Plastics by Photocatalytic Degradation" filed on Jun. 10, 2022, the disclosure of which is incorporated by reference herein in its entirety as part of the present disclosure.

TECHNICAL FIELD

The present disclosure relates to the field of treatment of polyester plastics and hydrogen production, and in particular, to a device for continuously producing hydrogen from polyester plastics by photocatalytic degradation.

BACKGROUND ART

With a large population in current society, plastics as the most common raw material of products are widely used in various industries, 60% of plastics, as waste, enter the environment, causing white pollution. Polyester plastic is one of the most widely used plastics at present, and mainly used in a plurality of fields, such as synthetic fibers, films, product packaging, beverages, mineral water bottles, and electronic appliance parts. At present, the disposal methods of waste plastics are mainly landfill and incineration, but both of these methods cause pollution to the environment, and at the same time cause a lot of waste of resources.

SUMMARY

Based on this, the present disclosure provides a device for continuously producing hydrogen from polyester plastics by photocatalytic degradation, thereby saving resources, avoiding waste and realizing the process of continuously degrading the polyester plastics to produce hydrogen.

According to one aspect of the present disclosure, a device for continuously producing hydrogen from polyester plastics by photocatalytic degradation is provided, including:

- a machine housing;
- a feeding mechanism provided at one side of the machine housing, a bottom of the feeding mechanism is in communication with a dissolving mechanism for transporting waste plastics to the dissolving mechanism;
- the dissolving mechanism provided inside the machine housing and configured for hydrolyzing the waste plastics into a solution containing small molecular monomers by means of a dissolving solution, and the dissolving mechanism transports the solution containing the small molecular monomers to a photocatalytic reactor through a solution circulation pipeline;
- the solution circulation pipeline arranged on another side of the machine housing, and two ends of the solution circulation pipeline are respectively connected to the dissolving mechanism and the photocatalytic reactor;
- the photocatalytic reactor arranged above the dissolving mechanism and configured for degrading plastics in the solution containing the small molecular monomers to collect a reaction solution and hydrogen.

According to an embodiment of the present disclosure, the feeding mechanism includes:

- a feeding hopper;
- a first motor fixedly connected to a side wall of the machine housing, an output shaft of the first motor is fixedly connected to a shaft of a crushing device for driving the crushing device to rotate to crush the waste plastics;
- the crushing device provided below the feeding hopper and including a first crushing roller and a second crushing roller which are engaged with each other, wherein the first motor is able to drive the first crushing roller and the second crushing roller to rotate in opposite directions, and the crushing device is configured for crushing the waste plastics into fragmented plastics;
- a scraping device, including a driving wheel fixed on the output shaft of the first motor, a driven wheel belt-driven by the driving wheel, and a scraper fixedly connected to the driven wheel, wherein the scraping device is configured for making the fragmented plastics enter the dissolving mechanism from a discharging hopper via the scraper;
- the discharging hopper.

According to an embodiment of the present disclosure, the dissolving mechanism includes a dissolving tank, the dissolving tank contains the dissolving solution for dissolving the fragmented plastics, a drain port is provided at a bottom of the dissolving tank, and the drain port is provided with a drain valve and a mesh shield.

According to an embodiment of the present disclosure, the dissolving tank is provided with a liquid level detection device, and the liquid level detection device includes:

- a liquid level gauge provided outside the machine housing, the liquid level gauge is configured for detecting and prompting a height of a liquid level in the dissolving tank;
- an overflow drain pipe provided below the discharging hopper, connected to the drain port, and configured for periodically replacing the dissolving solution.

According to an embodiment of the present disclosure, the dissolving mechanism further includes a dissolving area access door provided at 10-20 cm above the liquid level of the dissolving tank.

According to an embodiment of the present disclosure, the solution circulation pipeline includes:

- a liquid inlet pipe for conveying the solution containing the small molecular monomers from the dissolving tank to the photocatalytic reactor by means of a solution pump;
- an overflow return pipe for realizing a process of returning the reaction liquid from the photocatalytic reactor to the dissolving tank.

According to an embodiment of the present disclosure, a first valve assembly is mounted on one side of the solution pump close to the dissolving tank, the first valve assembly includes a gate valve, a filter and a ball valve, and the first valve assembly is configured for preventing fragmented waste plastics from entering the solution pump.

According to an embodiment of the present disclosure, a second valve assembly is mounted on one side of the solution pump close to the photocatalytic reactor, the second valve assembly includes another ball valve, a check valve and another gate valve, and the second valve assembly is configured for preventing solution from flowing backward.

According to an embodiment of the present disclosure, the photocatalytic reactor comprises:

- a light source;

a stirring device including a second motor and a catalyst grid, an output shaft of the second motor is in transmission connection with the catalyst grid via a rotating shaft;

an inert gas pipeline connected to a gas inlet of the photocatalytic reactor for providing an inert atmosphere for the photocatalytic reactor;

a gas collecting pipeline connected to a gas outlet of the photocatalytic reactor for collecting hydrogen generated in the photocatalytic reactor.

In accordance with an embodiment of the present disclosure, wherein the light source includes a glass window provided at a top of the photocatalytic reactor and a xenon lamp.

It can be seen from the above technical solution that the device for continuously producing hydrogen from the polyester plastics by photocatalytic degradation provided by the present disclosure has the following beneficial effects:

(1) The present disclosure provides a device for continuously producing hydrogen from polyester plastics by photocatalytic degradation which realizes fragmentation of the polyester plastics and then continuous delivery of fragmented polyester plastics to the dissolving mechanism by the feeding mechanism, hydrolysis of the fragmented polyester plastics into the small molecule monomers by the dissolving mechanism, a solution recycling process that the solution containing the small molecular monomers in the dissolving mechanism is transported to the photocatalytic reactor and the solution in the photocatalytic reactor is refluxed to the dissolving mechanism by the solution circulation pipeline, the process of degrading the polyester plastics, preparing hydrogen and collecting hydrogen by the photocatalytic reactor.

(2) The device for continuously producing hydrogen from the polyester plastics by photocatalytic degradation according to the present disclosure can decompose the waste plastics relatively environmentally by means of the arrangement of the dissolving mechanism and the photocatalytic reactor, and can recycle and periodically replace the dissolving solution by means of the arrangement of the solution circulation pipeline, thereby saving resources and avoiding waste.

1—machine housing;

2—feeding mechanism;

21—feeding hopper; 22—first crushing roller; 23—first motor; 24—scraper; 25—second crushing roller; 26—driving wheel; 27—driven wheel; 28—discharging hopper;

3—dissolving mechanism;

31—dissolving tank; 32—overflow drain pipe; 33—liquid level gauge; 34—drain port; 35—drain valve; 37—dissolving area access door;

4—solution circulation pipeline;

41—liquid inlet pipe; 42—filter; 43—ball valve; 44—solution pump; 45—check valve; 46—gate valve; 47—overflow return pipe;

5—photocatalytic reactor;

51—detachable top plate; 52—xenon lamp; 53—second motor; 54—rotating shaft; 55—catalyst grid; 56—glass window; 57—inert gas pipeline; 58—gas collecting pipeline; 59—flow rate controller.

DETAILED DESCRIPTION OF AN EMBODIMENTS

To make the objectives, technical solutions, and advantages of the present disclosure clearer, the following describes the present disclosure in detail with reference to the accompanying drawings and specific embodiments.

Figure 1:
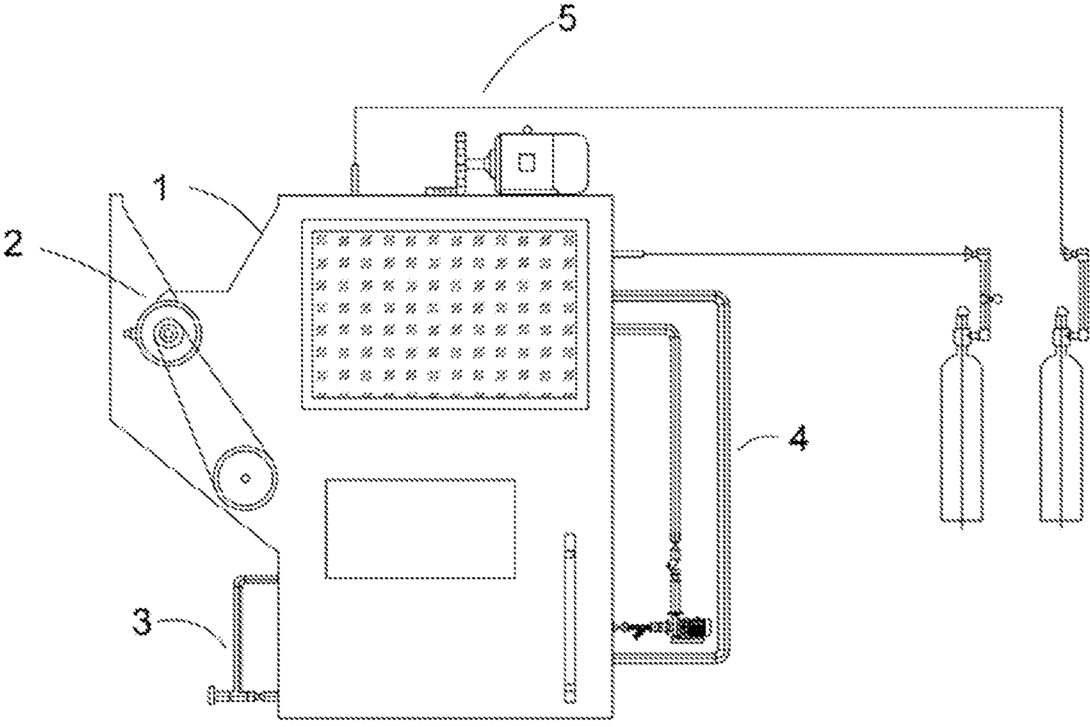
FIG. 1 is a rear view I of a device according to an embodiment of the present disclosure.

FIG. 1 is a rear view I of a device according to an embodiment of the present disclosure.

According to one aspect of the present disclosure, as shown in FIG. 1, provided is a device for continuously producing hydrogen from polyester plastics by photocatalytic degradation, including: a machine housing 1, a feeding mechanism 2, a dissolving mechanism 3, a solution circulation pipeline 4 and a photocatalytic reactor 5.

the feeding mechanism 2 is provided at one side of the machine housing 1, a bottom of the feeding mechanism 2 is in communication with the dissolving mechanism 3 for transporting waste plastics to the dissolving mechanism 3;

the dissolving mechanism 3 is provided inside the machine housing 1 and configured for hydrolyzing the waste plastics into a solution containing the small molecular monomers by means of a dissolving solution, the dissolving mechanism 3 transports the solution containing the small molecular monomers to the photocatalytic reactor 5 via the solution circulation pipeline 4;

the solution circulation pipeline 4 is arranged on the other side of the machine housing 1, two ends of the solution circulation pipeline 4 are respectively connected to the dissolving mechanism 3 and the photocatalytic reactor 5;

the photocatalytic reactor 5 is arranged above the dissolving mechanism 3 and configured for degrading plastics in the solution containing the small molecular monomers to collect a reaction solution and hydrogen.

The dissolving mechanism 3 and the photocatalytic reactor 5 are provided inside the machine housing 1, and the bottom of the feeding mechanism 2 is in communication with the dissolving mechanism 3 for transporting the waste plastics to the dissolving mechanism 3, the dissolving solution can be injected into the dissolving mechanism 3 to hydrolyze the waste plastics into the small molecule monomers, a left side wall of the dissolving mechanism 3 is provided with the solution circulation pipeline 4, which can transport the solution containing the small molecular monomers in the dissolving mechanism 3 to the photocatalytic reactor 5, and reflux a solution in the photocatalytic reactor 5 to the dissolving mechanism 3 for recycling, and an upper end of the solution circulation pipeline 4 is connected to the photocatalytic reactor 5, the photocatalytic reactor 5 degrades plastics in the solution containing the small molecular monomers, and at the same time, produces hydrogen for gas collection.

The present disclosure provides the device for continuously producing hydrogen from the polyester plastics by photocatalytic degradation, which realizes fragmentation of the polyester plastics and then continuous delivery of fragmented polyester plastics to the dissolving mechanism 3 by the feeding mechanism 2, hydrolysis of the fragmented polyester plastics into the small molecule monomers achieved by the dissolving mechanism 3, a solution recycling process that the solution containing the small molecular monomers in the dissolving mechanism 3 is transported to the photocatalytic reactor 5 and the solution in the photocatalytic reactor 5 is refluxed to the dissolving mechanism 3 by the solution circulation pipeline 4, the process of degrading the polyester plastics, preparing hydrogen and collecting hydrogen achieved by the photocatalytic reactor 5. In the present disclosure, a catalyst grid 55 is used and supplemented by an rotating motor, the reaction process is accelerated by means of rotation of the catalyst grid 55, the recovery and periodical replacement of the catalyst are facilitated, and furthermore, a circulation pipeline is provided to recycle the dissolving solution and replace it periodically, thereby saving resources, avoiding waste and achieving a process of continuously degrading the polyester plastics to produce hydrogen.

Figure 2:
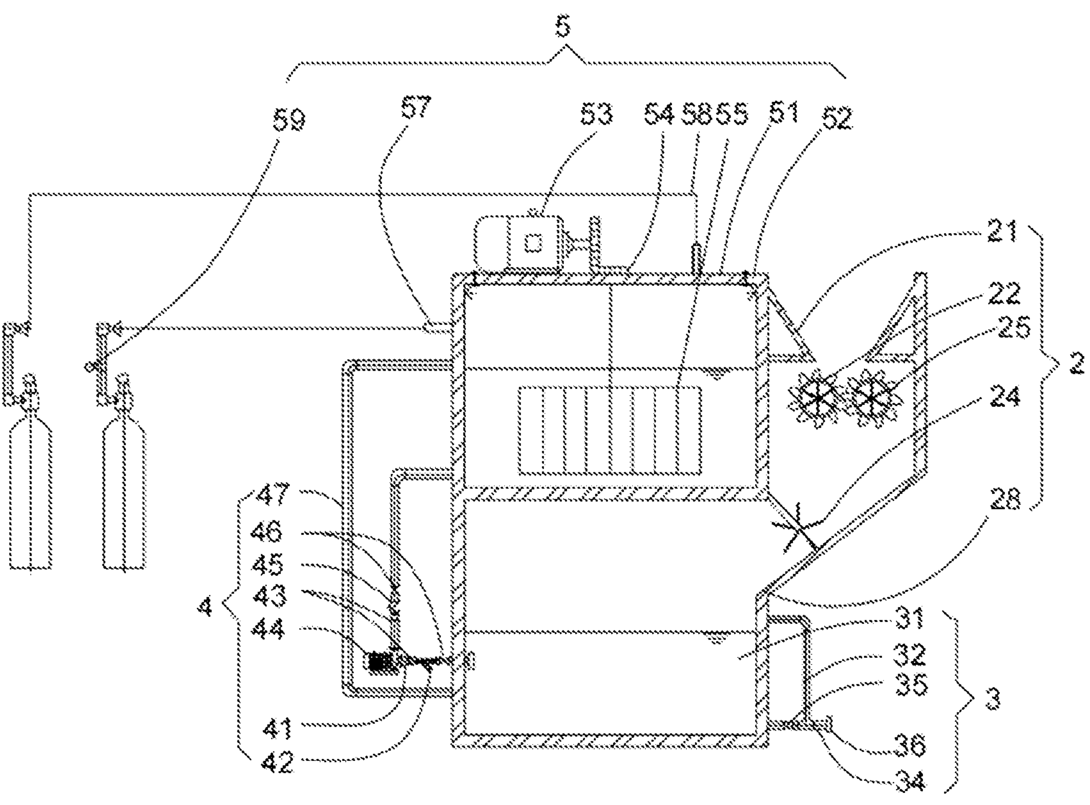
FIG. 2 is a front sectional view of the device according to an embodiment of the present disclosure.

FIG. 2 is a front sectional view of the device according to an embodiment of the present disclosure.

Figure 3:
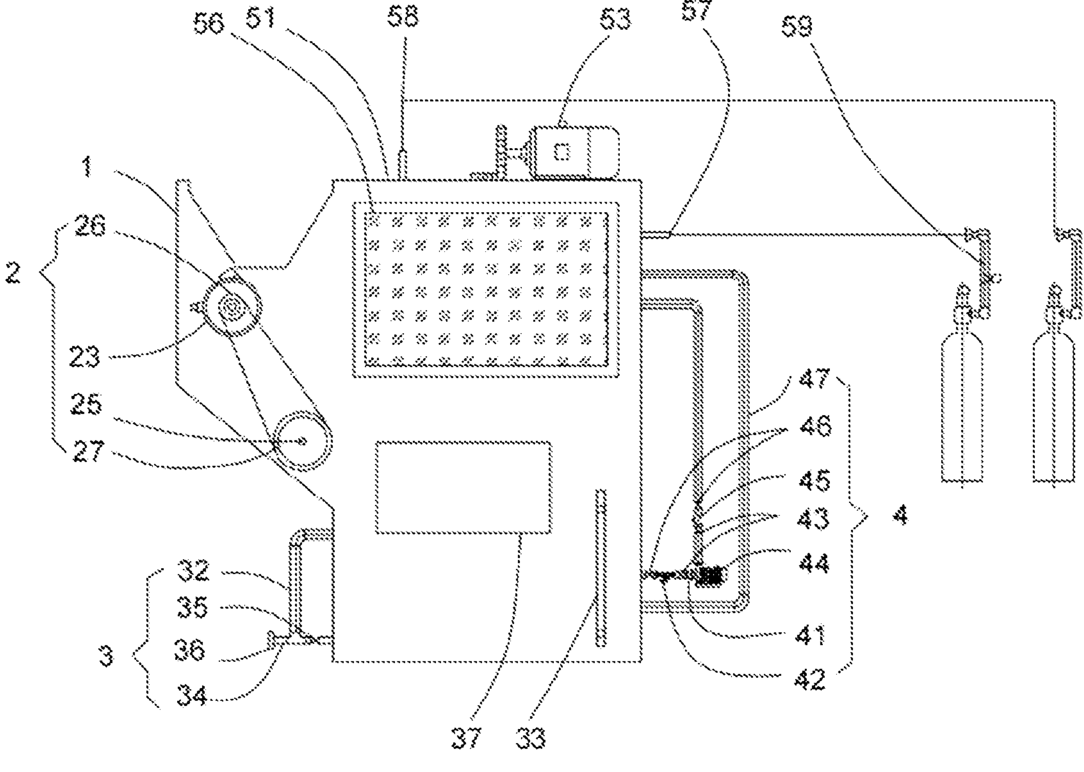
FIG. 3 is a rear view II of the device according to an embodiment of the present disclosure.

FIG. 3 is a rear view II of the device according to an embodiment of the present disclosure.

Figure 4:
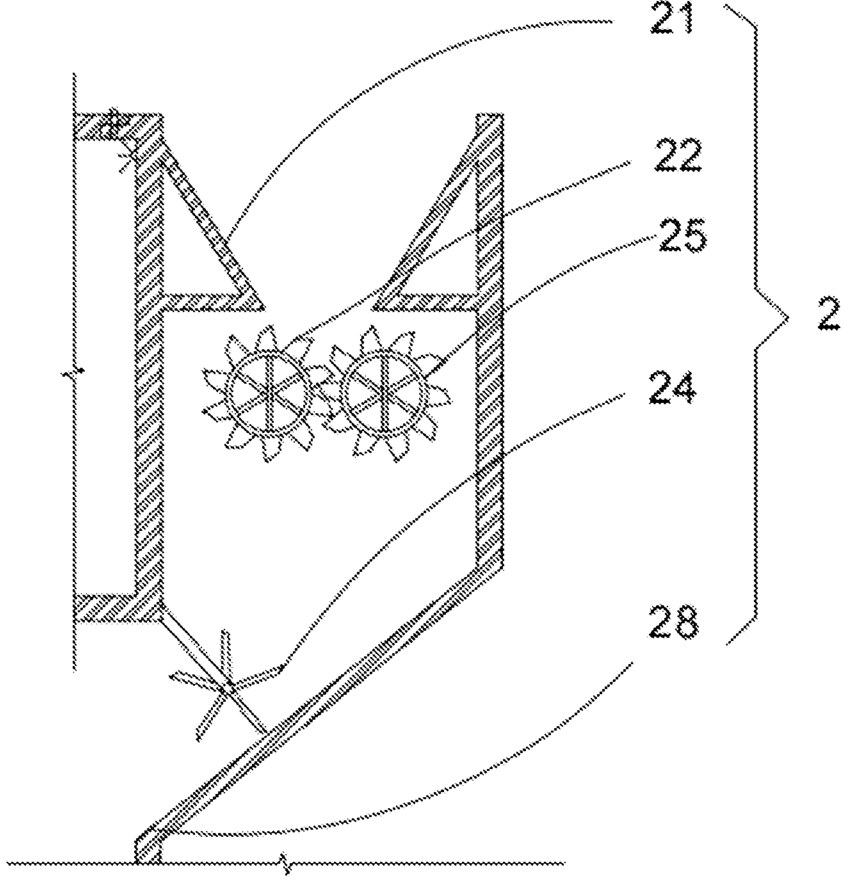
FIG. 4 is a schematic structural view of a feeding mechanism according to an embodiment of the present disclosure.

FIG. 4 is a schematic structural view of the feeding mechanism according to an embodiment of the present disclosure.

According to an embodiment of the present disclosure, as shown in FIGS. 2-4, the feeding mechanism 2 includes a feeding hopper 21, a first crushing roller 22, a first motor 23, a scraper 24, a second crushing roller 25, a driving wheel 26, a driven wheel 27 and a discharging hopper 28.

The first motor 23 is fixedly connected to a side wall of the machine housing 1, an output shaft of the first motor 23 is fixedly connected to a shaft of the crushing device for driving the crushing device to rotate to crush the waste plastics;

- the crushing device is arranged below the feeding hopper 21, including a first crushing roller 22 and a second crushing roller 25 which are engaged with each other, the first motor 23 can drive the first crushing roller 22 and the second crushing roller 25 to rotate in opposite directions, and the crushing device is configured for crushing the waste plastics into fragmented plastics;
- a scraping device includes the driving wheel 26 fixed on the output shaft of the first motor 23, the driven wheel 27 belt-driven by the driving wheel 26, and the scraper 24 fixedly connected to the driven wheel 27, is configured for making the fragmented plastics enter the dissolving mechanism 3 from the discharging hopper via the scraper 24.

The first motor 23 is fixedly connected to the side wall of the machine housing 1 corresponding to the feeding mechanism 2, the first crushing roller 22 and the second crushing roller 25 are arranged side by side below the feeding hopper 21, two ends of the first crushing roller 22 and the second crushing roller 25 are respectively fixedly connected to inner shafts, and the inner shafts penetrate the side wall of the machine housing 1. The output shaft of the first motor 23 is fixedly connected to the inner shaft of the first crushing roller 22, and drives the first crushing roller 22 and the second crushing roller 25 to rotate, so as to crush the waste plastics. The output shaft of the first motor 23 is sheathed with the driving wheel 26, the first motor 23 drives the driving wheel 26 to rotate so as to drive the driven wheel 27 to rotate, the driven wheel 27 is sheathed on a rotating shaft, the rotating shaft is fixedly connected to an inner shaft of the scraper 24, the driven wheel 27 drives an assembly of the scraper 24 to rotate, and the fragmented plastics enter the dissolving mechanism 3 from the discharging hopper 28 by the scraper 24.

According to an embodiment of the present disclosure, the dissolving mechanism 3 includes a dissolving tank 31. The dissolving tank 31 contains the dissolving solution for dissolving the fragmented plastics. A bottom of the dissolving tank 31 is provided with a drain port 34, the drain port 34 is provided with a drain valve 35 and a mesh shield.

The mesh shield can prevent foreign matters from entering a pipe, and the drain valve 35 can adjust the discharging state of the dissolving tank 31 based on actual situations.

Figure 5:
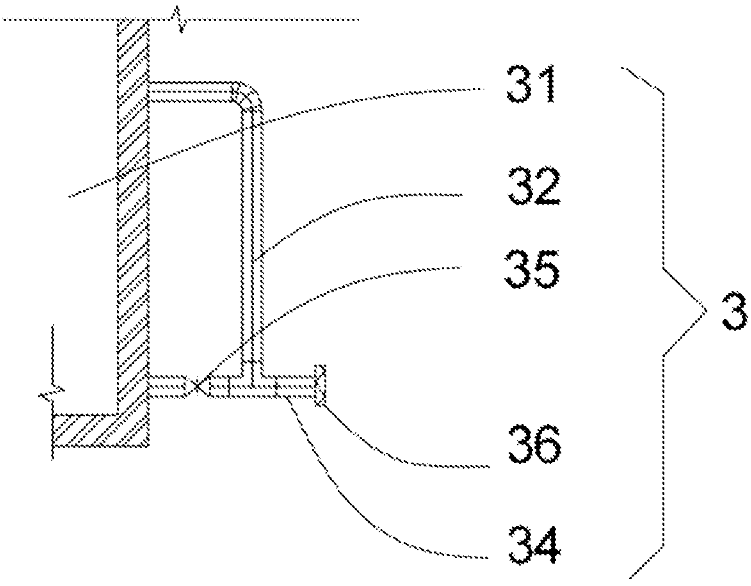
FIG. 5 is an enlarged structural schematic view of an overflow drain pipe of a dissolving mechanism according to an embodiment of the present disclosure.

FIG. 5 is an enlarged structural schematic view of an overflow drain pipe of the dissolving mechanism according to an embodiment of the present disclosure.

According to an embodiment of the present disclosure, as shown in FIG. 5, the dissolving tank 31 is provided with a liquid level detecting device, and the liquid level detecting device includes a liquid level gauge 33 and an overflow drain pipe 32.

The liquid level gauge 33 is provided outside the machine housing 1, and detects and prompts the height of a liquid level in the dissolving tank 31;

- the overflow drain pipe 32 is provided below the discharging hopper 28, connected to the drain port 34 and configured for periodically replacing the dissolving solution.

An inlet of the overflow drain pipe 32 is provided at 5 cm below the discharging hopper, and the liquid level is monitored by means of the liquid level gauge 33. When the liquid level is higher than the designed liquid level, a red warning button is turned on to signal the stopping of the feeding, and at the same time, a small amount of excessive solution is discharged to prevent the feeding mechanism 2 from being corroded. The liquid level gauge 33 is mounted outside the machine housing 1 corresponding to the dissolving tank 31; the drain port 34 is provided at the bottom of the dissolving tank 31 and is connected to a water outlet of the overflow drain pipe 32 for periodically replacing the dissolving solution; the drain valve 35 is mounted in front of the drain port 34; and the end of the overflow drain pipe 32 is provided with the mesh shield to prevent foreign matters from entering the overflow drain pipe 32. The dissolving tank 31 contains the dissolving solution for dissolving the fragmented waste plastics, wherein the dissolving solution is an alkaline solution.

According to an embodiment of the present disclosure, the dissolving mechanism 3 further includes a dissolving area access door 37 provided at 10-20 cm above the liquid level of the dissolving tank 31.

The dissolving area access door is provided on a back of the machine housing 1 and is located at 10 cm above the design liquid level of the dissolving tank 31, facilitating the machine housing 1 to be opened for access and maintenance.

Figure 6:
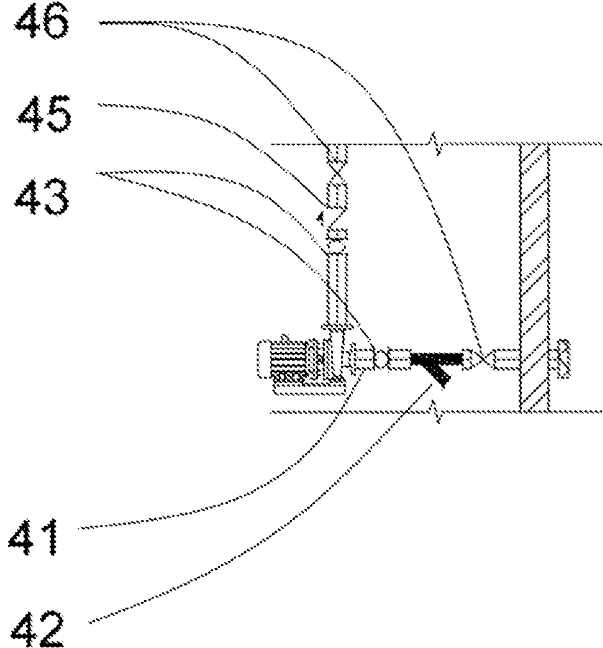
FIG. 6 is an enlarged schematic structural view of a liquid inlet pipe of a solution circulation pipeline according to an embodiment of the present disclosure.

FIG. 6 is an enlarged schematic structural view of a liquid inlet pipe of the solution circulation pipeline according to an embodiment of the present disclosure.

According to an embodiment of the present disclosure, as shown in FIG. 6, the solution circulation pipeline 4 includes the liquid inlet pipe 41, a filter 42, ball valves 43, a solution pump 44, a check valve 45, gate valves 46, an overflow return pipe 47.

The liquid inlet pipe 41 conveys the solution in which the small molecular monomers is dissolved therein from the dissolving tank 31 to the photocatalytic reactor 5 by means of the solution pump 44;

the overflow return pipe 47 realizes the process of returning the reaction liquid from the photocatalytic reactor 5 to the dissolving tank 31.

According to an embodiment of the present disclosure, a first valve assembly is mounted on one side of the solution pump 44 close to the dissolving tank 31, the first valve assembly includes a gate valve 46, the filter 42 and a ball valve 43, and the first valve assembly is configured for preventing the fragmented waste plastics from entering the solution pump 44.

According to an embodiment of the present disclosure, a second valve assembly is mounted on one side of the solution pump 44 close to the photocatalytic reactor 5, the second valve assembly includes another ball valve 43, the check valve 45 and another gate valve 46, and the second valve assembly is configured for preventing the solution from flowing backward.

The solution pump is mounted on the liquid inlet pipe 41 and provides power for the dissolving tank 31 to deliver the dissolving solution to the photocatalytic reactor 5. The gate valve 46, the filter 42 and the ball valve 43 are sequentially mounted in front of the solution pump 44 to prevent the fragmented waste plastics from entering the solution pump and then damaging the solution pump, and the other ball valve 43, the check valve 45 and the other gate valve 46 are sequentially mounted behind the solution pump to prevent the solution from flowing backward. The gate valves 46 are configured for closing the pipeline when the solution pump 44 is maintained, so as to facilitate access. The ball valves 43 are configured for balancing pressure difference of the pipeline, so as to ensure that the solution pump 44 operates stably. A water inlet of the overflow return pipe 47 is mounted at the reaction liquid level of the photocatalytic reactor 5, and the water outlet of the overflow return pipe 47 is mounted below the design liquid level of the dissolving tank 31, so as to realize the process of returning the dissolving solution from the photocatalytic reactor 5 to the dissolving tank 31.

FIG. 2 is a front sectional view of the device according to an embodiment of the present disclosure.

FIG. 3 is a rear view II of the device according to an embodiment of the present disclosure.

According to an embodiment of the present disclosure, as shown in FIGS. 2-3, the photocatalytic reactor 5 includes a light source, a detachable top plate 51, a second motor 53, a rotating shaft 54, the catalyst grid 55, an inert gas pipeline 57, a gas collecting pipeline 58, and a flow rate controller 59.

A stirring device includes the second motor 53 and the catalyst grid 55, an output shaft of the second motor 53 is in transmission connection with the catalyst grid 55 via the rotating shaft 54;

the inert gas pipeline 57 is connected to a gas inlet of the photocatalytic reactor 5 and configured for providing an inert atmosphere for the photocatalytic reactor 5;

the gas collecting pipeline 58 is connected to a gas outlet of the photocatalytic reactor 5 and configured for collecting hydrogen generated in the photocatalytic reactor 5.

The second motor 53 is mounted on the detachable top plate 51, the output shaft of the second motor 53 is engaged with the rotating shaft 54 via a gear, the other end of the rotating shaft 54 is sleeved with the catalyst grid 55, and the second motor 53 drives the rotating shaft 54 to rotate, thereby driving the catalyst grid 55 to rotate and stirring the reaction solution. A glass window 56 is provided on the back of the machine housing 1 corresponding to the photocatalytic reactor 5; when sunlight is sufficient, the photocatalytic reaction is performed by using solar energy; at the same time, a xenon lamp 52 is provided at the top of the photocatalytic reactor to serve as a standby light source to ensure the continuous operation of the device in case of the natural light is insufficient. The gas inlet is provided on the left side of the machine housing 1 corresponding to the photocatalytic reactor, and is connected to the inert gas pipeline 57 for continuously introducing nitrogen into the photocatalytic reactor to ensure that the reaction is carried out under an inert atmosphere. The flow rate controller 59 is mounted on the inert gas pipeline 57 to control and detect the flow rate of nitrogen. The gas outlet is provided at a top of the photocatalytic reactor and is connected to a gas collecting pipeline 58 for collecting hydrogen.

The device for continuously producing hydrogen from the polyester plastics by photocatalytic degradation of the present disclosure uses the catalyst grid 55 supplemented by the second motor 53 that drives the catalyst grid 55 to accelerate the reaction process by means of rotation of the catalyst grid 55, and facilitate the recovery and periodical replacement of the catalyst.

According to an embodiment of the disclosure, the light source includes the glass window 56 provided at the top of the photocatalytic reactor 5 and the xenon lamp 52.

The glass window 56 for collecting light and the xenon lamp 52 are provided at the same time which makes full use of sunlight as the reaction power and ensures continuous operation of the device.

The objectives, technical solutions, and beneficial effects of the present disclosure are further described in detail through the foregoing specific embodiments. It should be understood that the foregoing descriptions are merely specific embodiments of the present disclosure, but are not intended to limit the present disclosure. Any modification, equivalent replacement, or improvement made within the spirit and principle of the present disclosure shall belong to the scope of protection of the present disclosure.

What is claimed is:

1. A device for continuously producing hydrogen from polyester plastics by photocatalytic degradation, comprising:

a machine housing;

a feeding mechanism provided at one side of the machine housing, wherein a bottom of the feeding mechanism is in communication with a dissolving mechanism for transporting waste plastics to the dissolving mechanism;

the dissolving mechanism provided inside the machine housing, wherein the dissolving mechanism is configured for hydrolyzing the waste plastics into a solution containing small molecule monomers by means of a dissolving solution, and the dissolving mechanism transports the solution containing the small molecular monomers to a photocatalytic reactor through a solution circulation pipeline;

the solution circulation pipeline arranged at another side of the machine housing, wherein two ends of the solution circulation pipeline are respectively connected to the dissolving mechanism and the photocatalytic reactor; and the photocatalytic reactor arranged above the dissolving mechanism, wherein the photocatalytic reactor is configured for degrading plastics in the solution containing the small molecular monomers to obtain a reaction solution and hydrogen.

2. The device according to claim 1, wherein the feeding mechanism comprises:

a feeding hopper;

a first motor fixedly connected to a side wall of the machine housing, wherein an output shaft of the first motor is fixedly connected to a shaft of a crushing device for driving the crushing device to rotate to crush the waste plastics;

the crushing device provided below the feeding hopper, and comprising a first crushing roller and a second crushing roller which are engaged with each other, wherein the first motor is able to drive the first crushing roller and the second crushing roller to rotate in opposite directions, and the crushing device is configured for crushing the waste plastics into fragmented plastics;

a scraping device comprising a driving wheel fixed on the output shaft of the first motor, a driven wheel belt-driven by the driving wheel, and a scraper fixedly connected to the driven wheel, wherein the scraping device is configured for making the fragmented plastics enter the dissolving mechanism from a discharging hopper via the scraper; and the discharging hopper.

3. The device according to claim 1, wherein the dissolving mechanism comprises a dissolving tank, the dissolving tank contains the dissolving solution for dissolving the fragmented plastics, a drain port is provided at a bottom of the dissolving tank, and the drain port is provided with a drain valve and a mesh shield.

4. The device according to claim 3, wherein the dissolving tank is provided with a liquid level detection device, and the liquid level detection device comprises:

a liquid level gauge provided outside the machine housing, the liquid level gauge is configured for detecting and prompting a height of a liquid level in the dissolving tank;

an overflow drain pipe provided below the discharging hopper, connected to the drain port, and configured for periodically replacing the dissolving solution.

5. The device according to claim 3, wherein the dissolving mechanism further comprises a dissolving area access door provided at 10-20 cm above the liquid level of the dissolving tank.

6. The device according to claim 1, wherein the solution circulation pipeline comprises:

a liquid inlet pipe for conveying the solution containing the small molecule monomers from the dissolving tank to the photocatalytic reactor by means of a solution pump;

an overflow return pipe for realizing a process of returning the reaction liquid from the photocatalytic reactor to the dissolving tank.

7. The device according to claim 6, wherein a first valve assembly is mounted on one side of the solution pump close to the dissolving tank, the first valve assembly comprises a gate valve, a filter and a ball valve, and the first valve assembly is configured for preventing fragmented waste plastics from entering the solution pump.

8. The device according to claim 6, wherein a second valve assembly is mounted on one side of the solution pump close to the photocatalytic reactor, the second valve assembly comprise another ball valve, a check valve and another gate valve, the second valve assembly is configured for preventing solution from flowing backward.

9. The device according to claim 1, wherein the photocatalytic reactor comprises:

a light source;

a stirring device comprising a second motor and a catalyst grid, an output shaft of the second motor is in transmission connection with the catalyst grid via a rotating shaft;

an inert gas pipeline connected to a gas inlet of the photocatalytic reactor for providing an inert atmosphere for the photocatalytic reactor;

a gas collecting pipeline connected to a gas outlet of the photocatalytic reactor for collecting hydrogen generated in the photocatalytic reactor.

10. The device according to claim 9, wherein the light source comprises a glass window provided at a top of the photocatalytic reactor and a xenon lamp.

* * * * *